United States Patent [19]

Seely

[11] Patent Number: 4,529,701
[45] Date of Patent: Jul. 16, 1985

[54] PRODUCT AND PROCESS FOR STIMULATING BACTERIAL ACTION IN AN ANAEROBIC DIGESTION SYSTEM

[75] Inventor: Robert J. Seely, Loveland, Colo.

[73] Assignee: American Genetics International, Inc., Arvada, Colo.

[21] Appl. No.: 622,500

[22] Filed: Jun. 20, 1984

Related U.S. Application Data

[63] Continuation-in-part of Ser. No. 435,389, Oct. 20, 1982, abandoned.

[51] Int. Cl.³ .................. C02C 5/02; C02C 1/00; C02F 5/08
[52] U.S. Cl. .................. 435/244; 252/135; 252/174.14; 252/174.25; 252/175; 252/179; 252/181; 435/172.1; 435/801; 435/822; 435/842
[58] Field of Search .......... 252/135, 174.14, 174.25, 252/175, 179, 181; 435/244, 822, 842, 172, 801

[56] References Cited

U.S. PATENT DOCUMENTS

| | | | |
|---|---|---|---|
| 3,010,876 | 11/1961 | Badia et al. | 195/51 |
| 4,148,603 | 4/1979 | Schwuger et al. | 252/179 |
| 4,166,039 | 8/1979 | Wise | 252/174.14 |
| 4,321,142 | 3/1982 | Starr | 435/244 X |
| 4,411,809 | 10/1983 | Wixon | 252/179 |
| 4,429,043 | 1/1984 | Paton | 435/801 X |
| 4,476,224 | 10/1984 | Adler | 435/801 X |
| 4,491,522 | 1/1985 | Ishida et al. | 435/801 X |

FOREIGN PATENT DOCUMENTS 0608830  5/1978  U.S.S.R. .................. 435/244

OTHER PUBLICATIONS

Anaerobic Biological Treatment Processes, article entitled "Toxicity, Synergism and Antagonism in Anaerobic Waste Treatment Processes", by Irvin Jay Kugelman and K. K. Chin: pp. 55-90, F. G. Pohland, Ed., Washington, D.C. A.C.S. (1971).

*Primary Examiner*—John E. Kittle
*Assistant Examiner*—Mukund J. Shah
*Attorney, Agent, or Firm*—John L. Isaac

[57] ABSTRACT

A product and process for stimulating bacterial action in an anaerobic digestion system is disclosed. The product includes an inhibitory ion regulating component and an inorganic pyrophosphate containing compound. The process includes forming a mixture of the described product, and then adding an effective amount of the product mixture to the anaerobic digestion system to stimulate and enhance bacterial growth and metabolism therein.

18 Claims, No Drawings

PRODUCT AND PROCESS FOR STIMULATING BACTERIAL ACTION IN AN ANAEROBIC DIGESTION SYSTEM

CROSS REFERENCE

The present invention is a continuation-in-part of U.S. patent application Ser. No. 06/435,389 filed Oct. 20, 1982, now abandoned.

BACKGROUND OF THE INVENTION

1. Field of the Invention

This invention relates generally to anaerobic bacterial digestion systems and more particularly to products and processes for improving such anaerobic digestion systems. Specifically, the subject invention relates to a product and process designed to stimulate and increase the metabolic action of bacteria present in anaerobic sewage digestion systems such as septic tanks, anaerobic digesters, and the like, and especially in instances when such systems have gone sour.

2. Description of the Prior Art

Anaerobic bacterial digestion systems are utilized in a wide variety of situations. Most commonly, such situations involve various types of residential and industrial sewage treatment facilities. One such common facility is the septic tank system which is generally designed for home residential use and is adapted to receive and treat a wide variety of organic waste matter including particulate material. The septic tank system is generally designed to operate in a continuous manner over a wide variety of temperatures. Another common type of facility is the anaerobic digester which is generally designed to be run at certain specified temperatures over a specific period of time and is normally adapted to receive a particular type of waste stream such as manure from a farm area, a chemical waste stream from a manufacturing plant, and the like.

Another type of anaerobic digestion system includes anaerobic fermentation systems adapted to produce various food stuffs. Since such systems are not oriented to receiving waste sewage products but are rather designed to produce various food products, the specific organic material received by such systems differs greatly from typical sewage systems as described above. However, the anaerobic digestion process which takes place within such systems is quite similar to that occurring within a sewage treatment system.

Anaerobic digestion systems as described above generally operate most efficiently in a neutral or slightly basic pH environment. Acidity in the system environment tends to inhibit the metabolism rate of anaerobic bacteria as well as their growth, and the stronger the acidity, the greater the inhibition. Thus, when such systems become sour, or acidic, their efficiency decreases accordingly, and organic matter tends to build up in the system without being effectively treated. In the case of a residential septic system, waste matter is putrefied in a septic tank by decomposition through bacterial action. A souring of the septic tank environment reduces the decomposition action and allows organic matter to fill the tank. This continual addition of organic matter to the tank without effective decomposition will eventually cause a breakdown in the system and backup of the pipes leading to the tank. Similar results can be found in other anaerobic digestion environments wherein the environment has become soured.

One common way to rejuvenate a soured system, or to prevent souring of a healthy system and thereby stimulate continued bacterial action, is to add one or more chemicals to the system to increase the pH thereof. One commonly advertised product presently on the market is SEPTO-SOLVE, a trademark product manufactured by Cansan Consumer Products of Canada. This particular product contains hydrated lime which would be expected to raise the pH to thereby increase biodegradation within the system and promote recovery. One distinct problem with adding such a product a closed waste treatment system is that it tends to raise the pH too much, and this will significantly decrease a microbial activity.

Another approach to rejuvenating a sour anaerobic system is to add additional bacteria and nutrients to the environment. A product which embodies this technique is known as RID-X, a trademark product manufactured by The d-Con Company, Inc. This particular product contains dried sewage sludge as well as additional organic matter. However, a problem with this type of product is that the bacteria contained in a dried sewage sludge are frequently not particularly viable considering the stress of the drying process as well as the exposure of anaerobic bacteria to oxygen. Without having healthy, viable bacteria, the mere addition of organic matter to an already sour system may in fact be more harmful than beneficial.

SUMMARY OF THE INVENTION

Therefore, it is one object of the present invention to provide an improved means for stimulating bacterial action in an anaerobic digestion environment.

It is another object of the present invention to provide a product and process for rejuvenating a sour septic tank system.

It is yet another object of the present invention to provide a product and process for rejuvenating a sour anaerobic digester.

It is a further object of the present invention to provide a product and process for enhancing and stimulating bacterial metabolism and growth in an anaerobic waste digestion system.

To accomplish the above and other objects of the present invention, a product is provided for stimulating bacterial action in an anaerobic digestion environment. This product includes a mixture of an inhibitory ion regulating component and an inorganic pyrophosphate-containing compound. A process is also disclosed for stimulating and enhancing bacterial action in an anaerobic digestion system by forming the product mixture as disclosed above, and then adding an effective amount of this mixture to the system in order to stimulate bacterial growth and metabolic activity therewithin.

In a preferred embodiment of the present invention, the product mixture includes an inhibitory ion regulating component which preferably comprises an ionic substance antagonistic toward cations which inhibit bacterial action within the system. Finally, any ionic form of inorganic pyrophosphate may be utilized as long as the ions therefrom do not tend to severly inhibit bacterial action with the system.

DETAILED DESCRIPTION OF THE PREFERRED EMBODIMENTS

Anaerobic digestion systems generally operate most efficiently in a pH range of 6.5–7.5. Increases above 7.5 or so tend to inhibit microbial activity within the system, while decreases in the pH, or souring of the system, below about 6.5 also substantially decrease the microbial activity thereof. In particular, as anaerobic bacteria decompose organic matter within the system, the bi-products therefrom tend to decrease the pH, thus reducing the effectiveness of the bacteria present within the system. A healthy system will tend to rejuvenate itself. However, even a healthy system will eventually tend to decrease in overall pH due to continued input of microbial activity bi-products.

As previously indicated, one prior art technique for dealing with a soured waste treatment system is simply to add lime or its equivalent to increase the pH of the environment. However, it has been found that this is merely a temporary situation and, by itself, is insufficient to result in long term rejuvenation of a soured system. Moreover, the addition of such chemicals can raise the pH too high, which can also be detrimental to the system.

In studying the regulation of biomass fermentation to methane, it was discovered that the addition of inorganic pyrophosphate to an anaerobic environment can increase the growth and metabolic activity of anaerobic bacteria. It was surmized that part of this increased growth activity was due to the fact that pyrophosphate can supply the microbial system with phosphorus, an essential nutrient, without adding additional organic matter to the system. As previously indicated, the addition of other organic matter to a sour anaerobic digestion system can be detrimental to the system. Thus, it was concluded that the addition of pyrophosphate to an anaerobic digestion system, and in particular a soured system, might assist in rejuvenating or improving the activity within the system by promoting growth of the bacteria within the system. In tests that were run (see below), it was discovered that pyrophosphate, and particularly the tetra-sodium form, is basic and can therefore effectively raise the pH of the system environment as well as provide nutrients to the system for bacterial growth.

In studying the anaerobic digestion environment, it was found that certain ions such as calcium, potassium, and the like, tend to inhibit bacterial growth therein, while certain other ions such as magnesium, iron, manganese, nickel, cobalt, and other like trace elements, promote bacterial growth. However, it was also discovered that pyrophosphate tends to chelate some of the bacterial growth enhancing ions and therefore provide these ions as well as a nutrient value for bacterial growth. This additional chelation function further promotes bacteriological growth and metabolic activity within an anaerobic system thereby improving a healthy system as well as rejuvenating a sour system.

It was discovered, however, that the mere addition of inorganic pyrophosphate material to an anaerobic digestion system was not in and of itself the total answer.

As previously mentioned, certain cations, such as calcium or potassium, within the anaerobic digestion environment tend to inhibit bacterial growth. Each of these cations in and of itself will tend to inhibit bacterial growth and metabolism. Thus, if the calcium or potassium level of a particular environment increases, the bacterial activity will decrease due to the inhibitory effect of such cations. However, it is also known that while each of these cations by themselves may inhibit bacterial growth, the addition of another cation to the environment can produce an antagonistic effect toward the original ionic inhibitor. For example, while calcium, by itself, will tend to inhibit bacterial action and sodium, by itself, will tend to inhibit bacterial action, the addition of sodium with the calcium in the environment will substantially reduce the inhibitory effect of the calcium and sodium combined. Thus, it has been found that the addition of an inhibitory ion regulating component to the inorganic pyrophosphate tends to further enhance bacterial growth and metabolic activity within the anaerobic digestion environment. Why these actions act in an antagonistic manner toward each other is unknown. However, such activity has been documented by Kugelman, I. J. and Chin, K. K., "Toxicity, Synergism, and Antagonism In Anaerobic Waste Treatment Processes," in *Anaerobic Biological Treatment Process,* pp. 55–90, F. G. Pohland, ed., Washington, D.C., A.C.S., (1971), the contents of which are herein specifically incorporated by reference.

The inorganic pyrophosphate can be added to the mixture of the present invention in any desirable ionic form. However, it is preferred that the pyrophosphate be selected from sodium pyrophosphate, potassium pyrophosphate, di-sodium di-potassium pyrophosphate, and combinations thereof. The particularly preferred form is sodium pyrophosphate. This particular form is selected due to the cations associated with the pyrophosphate, which cations can be utilized in conjunction with the inhibitory ion regulator component. The sodium also improves the ion balance in the system. It is preferred that the pyrophosphate component of the product mixture range from about 50–95 weight percent with an optimum being at 50%–75%.

The inhibitory ion regulating component can be any desired material which will provide the appropriate cations as described above. It is preferred that sodium in the form of sodium carbonate of bicarbonate be utilized. Obviously an inhibitory ion regulating component must be utilized which has a cation different from the inhibitory cations already present in the environment in order to assure its antiinhibitory function. The carbonate form is preferred because the carbonate will also assist in increasing the pH of a soured system, thereby further promoting bacterial growth and metabolism. This, in conjunction with the base nature of pyrophosphate, will act to elevate the pH of the system in a controlled manner. Generally, approximately 50 to 5 weight percent of the inhibitory ion regulating component is used in the product mixture of the present invention and preferably 50 to 25%.

As previously described, a particular environment in which the present invention is especially useful is the sour septic tank system. In practicing the process of the invention by adding the above-described product mixture to a septic holding tank or the like, the preferred range of the pyrophosphate in the tank system is 0.03 to 0.06 weight percent with a usable range being about 0.005 to 0.10 weight percent. In addition, 0.03 to 0.06 weight percent is the preferred range for the inhibitory ion regulating component while the usable range is about 0.005 to 0.10 weight percent. Should the pyrophosphate fall below the minimum, the product and process would be ineffective, while should the pyrophosphate be above 0.10 weight percent, the cost would be unnecessarily great. If the inhibitory ion regulating component went above its maximum, it would raise the pH too much, and should it fall below its minimum, it would be ineffective.

The present invention may also be used in other waste systems such as anaerobic digesters. This particular product mixture is capable of rejuvenating such sour systems regardless as to whether they are general systems such as septic tanks, or more specific systems designed for particular waste product streams as an anaerobic digesters. It is also believed that the present invention may be utilized in anaerobic fermentation processes for the production of food and the like, which processes are well known in the art and will not be detailed herein. Since none of the chemicals contained in the product mixture are toxic, such product mixtures may be utilized in food producing schemes and systems.

The examples provided below are designed to illustrate the invention and are not intended to be limiting in any manner.

EXAMPLE I

To test the validity of the present invention, duplicate 500 ml serum bottles were filled with 300 ml sludge having 10% bacterial seed inoculum. This sludge was composed of raw sewage flowing into a municipal sewage treatment facility and contained a gross culture of anaerobic bacteria. This mixture was selected to represent that typical of home septic tank waste systems. The intial pH of the raw sewage was measured at 6.97, and the low amount of speed inoculum was shocked by a brief exposure to air and cooling, that is 37° C.-27° C.

Various chemical products were selected to be tested against the product mixture of the present invention as well as against controls wherein no chemicals were added. These products are described below. However, during each test, the addition of the selected chemical products were made at a 0.06% weight/volume for each bottle. The bottles were then flushed with nitrogen, capped, and placed in a 37° C. incubator without any stirring. The percent carbon dioxide generated, the pH, and the volatile solids were then monitored for testing.

For this test, there were 8 samples. Two were control samples wherein no chemicals were added, two were samples to which were added the SEPTO-SOLVE product previously described, two samples included the RID-X product previously described, and two samples had mixtures of a pyrophosphate product added to them. In this example, the product mixture of the invention consisted of 100 weight percent of sodium pyrophosphate and 0 weight percent of sodium carbonate.

Tables I and II disclose, respectively, the pH and the carbon dioxide production of the various samples. Turning to the results indicated in Table I, the pH of the starting sludge preparation containing 10% seed inoculum was 6.97. Upon the addition of the chemicals to each of the 6 test samples, each at 0.06% weight/volume, the pH of each changed significantly. The RID-X product, which basically consists of bacteria and nutrients, actually lowered the pH of the samples. The SEPTO-SOLVE product raised the pH far too high to an average of 8.44. The pH of the samples containing the present invention adjusted exactly into the proper range for improved microbial activity as indicated by day 0 in Table I. Each of the test samples were incubated for 7 days. After the first 7 days, further decreases in pH were recorded for the controls, as expected. This indicated that the digesters were indeed "sick" and that the test model was valid. The test samples containing the RID-X fell even further in pH than the control samples. Samples containing SEPTO-SOLVE and the present invention did not fall as far in pH.

TABLE I

| Sample | Treatment | pH valves | | | |
|---|---|---|---|---|---|
| | | Day 0 | Day 7 | Day 7 | Day 14 |
| 1 | Control | 6.96 | 6.40 | 6.40 | 6.84 |
| 2 | Control | 6.97 | 6.39 | 6.39 | 6.85 |
| 3 | RID-X | 6.85 | 6.34 | 6.54 | 6.82 |
| 4 | RID-X | 6.89 | 6.35 | 6.53 | 6.84 |
| 5 | SEPTO-SOLVE | 8.42 | 6.59 | 7.62 | 7.20 |
| 6 | SEPTO-SOLVE | 8.46 | 6.62 | 7.36 | 7.20 |
| 7 | Pyrophosphate | 7.12 | 6.46 | 6.76 | 6.94 |
| 8 | Pyrophosphate | 7.11 | 6.53 | 6.78 | 6.93 |

A second dose of the chemicals was then given in similar quantities on the seventh day, and the pH values again rose on day 7 for each except the control samples. By day 14 the values for the SEPTO-SOLVE again fell, indicating that periodic treatment of a sour system is necessary and that the frequency of additions will be a factor of how severely this system is inhibited. The other samples increased in pH, including the controls. This indicated a recovery in the system. It should be indicated that the manufacturers' directions for use of the two commercial products recommended frequent additions, and the doses used in Example I are not inconsistent with their recommendations. Note here that the present invention throughout the entire 14-day cycle maintained a pH value within an optimum range for maximum microbial activity. Moreover, had the samples contained activated carbon and sodium bicarbonate as in Example II below, it's believed that the pH levels would have been even better.

TABLE II

| Sample | Treatment | % $CO_2$ in Off-Gas | |
|---|---|---|---|
| | | Day 7 | Day 14 |
| 1 | Control | 47.6 | 32.3 |
| 2 | Control | 47.6 | 30.6 |
| 3 | RID-X | 50.2 | 30.9 |
| 4 | RID-X | 47.9 | 30.6 |
| 5 | SEPTO-SOLVE | 42.1 | 17.4 |
| 6 | SEPTO-SOLVE | 39.4 | 19.6 |
| 7 | Pyrophosphate | 45.5 | 27.2 |
| 8 | Pyrophosphate | 42.6 | 26.9 |

The percent carbon dioxide in the off-gas is also a measure of the health of an anaerobic digestion system. $CO_2$ values higher than about 40% usually indicate less than optimal digestion. The lower the $CO_2$, the better the environment for anaerobic digestion. As indicated, Table II lists values of $CO_2$ production for each of the test samples. The RID-X product resulted, after 7 to 14 days, in being no better than the control samples. The SEPTO-SOLVE and the present invention showed the lowest percent $CO_2$ production.

Finally, non-quantitative inspections of solids settling in the samples and the thickness of the floating layer and the samples were noted. It should be noted that most septic systems involve an overflow drain arrangement into a rock bed or tile drainage system. It is, therefore, best to retain the solids in the septic tank itself and only allow clarified liquids to flow over into the drainage end of the system. Thus, a healthy system retains the decomposing solid organic matter at the bottom. Visual inspection of the samples indicated that clarification seemed to be best with the SEPTO-SOLVE samples and the samples treated with the present invention.

EXAMPLE II

Serum bottles filled with sludge similar to Example I were provided for this example. Table III, provided below, lists the various samples tested in this example. Samples 1 and 2 were controls, while 3 and 4 contained 0.03% by weight of sodium pyrophosphate only, similar to samples 7 and 8 of Example I. Samples 5 and 6 also contained 0.06% by weight of sodium carbonate, the inhibitory ion regulating component. It should be noted that the resulting pH values increased first from the controls to the addition of pyrophosphate alone and then increased further with the addition of $NaHCO_3$. Samples 7 and 8 added 0.06% of an activated carbon complexing agent, and the pH values again rose. Samples 9 and 10 doubled the pyrophosphate from samples 3 and 4, and samples 11 and 12 added the $NaHCO_3$ to the pyrophosphate of 9 and 10.

TABLE III

| Sample | Composition | | | pH |
|---|---|---|---|---|
| | $Na_4P_2O_7$ | $NaHCO_3$ | act. C | |
| 1 | 0 | 0 | 0 | 6.83 |
| 2 | 0 | 0 | 0 | 6.84 |
| 3 | 0.03% | 0 | 0 | 6.91 |
| 4 | 0.03% | 0 | 0 | 6.94 |
| 5 | 0.03 | 0.06% | 0 | 7.04 |
| 6 | 0.03 | 0.06 | 0 | 7.07 |
| 7 | 0.03 | 0.06 | 0.06 | 7.15 |
| 8 | 0.03 | 0.06 | 0.06 | 7.10 |
| 9 | 0.06 | 0 | 0 | 7.01 |
| 10 | 0.06 | 0 | 0 | 6.97 |
| 11 | 0.06 | 0.06 | 0 | 7.23 |
| 12 | 0.06 | 0.06 | 0 | 7.14 |

From the results of Table III and the previous Example I, it is clear that while pyrophosphate alone will increase bacteriological output in an anaerobic environment, the addition of the inhibitory ion regulating component significantly improved the bacterial growth and metabolism and acted to rejuvenate a sour anaerobic system as previously explained.

EXAMPLE III

A field test at a municipal sewage treatment plant (MST) located in the metropolitan Denver, Colo. area was conducted. The MST was a small trickling filter plant that can be characterized as being 95% domestic origin and 5% light restaurant origin. There are no significant industrial inputs to this particular plant. The plant was typical of its type and had primary digester with an operating capacity of 105,000 gallons. The rate of loading of primary clarifier settled sludge was approximately 6,500 gal/day at an average solids content of 3%.

Digester stirring was accomplished by circulating the digester sludge through an external heat exchanger, at 98° F. The mixing was not thorough, however.

Unfortunately, this facility had no means of monitoring biogas production. The MST lab does measure $CO_2$ on a weekly basis, and samples were taken for methane analysis twice a week.

The compound used in this test comprised 50% tetra sodium pyrophosphate and 50% $Na_2CO_3$. It was added dry, at the grease pit; from here it was pumped directly to the primary digester. An initial dose of 262 lbs. was given to immediately bring the digester to 0.03% (weight of dry compound per weight of wet digester sludge). Additional doses of 48 lbs. were given every three days at the grease pit, thereby maintaining this 0.03% concentration in the digester.

Based on solids loading, the compound was added at a rate of 20 lbs/dry ton of solids.

The performance parameters that were monitored, and the frequency of sampling are outlined in table IV, below. Before compound addition, there was a 30 day period of background data collection. The initial dose of compound was then administered, followed by the maintenance doses for a second 30 day period.

TABLE IV

| Test | Frequency |
|---|---|
| pH | 3/week |
| Volatile Acids | 3/week |
| Alkalinity | 3/week |
| Suspended Solids | 2/week |
| Total and Volatile Solids | 1/week |
| % Methane | 2/week |

The average and standard deviations for the parameters tested before and after compound addition in this Example III are shown in Table V below. Significant increases are seen in pH and alkalinity. Volatile acids show a decrease. The ratio of alk:va increases from 4.95 to 12.2. The higher this ratio, the better the capacity of the digester to handle a variety of upset conditions. However, the ratio before compound addition (4.95) was perfectly adequate.

The level of total solids increased somewhat. At 2 weeks into the compound addition phase the digester loading was increased by approximately 16% which may account for some of the increased in TS. Even though the loading rate was raised, the volatile solids decreased by 11% from an average of 60.84% to 54.10%. The increased digester loading was a function of increased pumping rate only. There was no change in the nature of the influent (increased grit, etc.).

TABLE V

| | pH | VA | ALK | SS | % TS | % VS | % CH4 |
|---|---|---|---|---|---|---|---|
| Before Cpmd: | | | | | | | |
| Avg | 6.17 | 433 | 2143 | 31808 | 3.35 | 60.84 | 63.1 |
| St Dev | 0.11 | 159 | 158 | 10402 | 0.10 | 1.86 | 2.9 |
| After Cpmd: | | | | | | | |
| Avg | 6.85 | 391 | 4778 | 42486 | 4.01 | 54.10 | 62.3 |
| St Dev | 0.17 | 145 | 1220 | 5987 | 0.11 | 1.93 | 2.0 |

VA-volatile acids, mg/l as acetic acid; ALK = alkalinity, mg/l as $CaCO_3$; SS = suspended solids, mg/l; % VS = volatile solids expressed as the percentage of the total solids (TS). All assays performed according to Standard Methods, 15th ed.

Suspended solids varied so widely that no significant changes can be inferred. Percent methane was not appreciably effected either.

Similar patterns in pH, alkalinity, acids, and solids were seen by a second sampling. This data regarding total and volatile solids are given in Table VI.

TABLE VI

| | | Total Solids | Volatile Solids |
|---|---|---|---|
| Before Cpmd: | Average = | 3.29% | 63.04% |
| | Std Dev = | 0.57 | 1.81 |
| After Cpmd: | Average = | 4.20% | 54.50% |
| | Std Dev = | 0.07 | 0.52 |

This particular MST plant was under-performing before the addition of the present invention. The marginal pH of 6.1, and the level of volatile solids (60.8% of TS), indicate the bacterial population was not degrading the organic material as completely as it should. It's a bit surprising that the volatile acids were not greater than they were. The addition of the compound of the present invention significantly improved these parameters. Greater degrees of improvement can be expected at MST facilities experiencing more drastic under-performance.

Field tests are difficult but necessary. The numbers never seem to cooperate. Between equipment failures, fluctuating feedstocks, and the inherent lack of controls, beneficial effects are not always readily apparent during short term observations. Although the data points for the monitored parameters were often rough and scattered, the averages and standard deviations for points collected over 30 day periods reflect reasonable confidence levels.

EXAMPLE IV

A large sewage treatment plant in the midwest suffered a major biological upset during January of the testing year. The harsh winter further complicated the difficulties by imposing mechanical breakdowns as well. The sanitation system includes two anaerobic digestors of 373,000 gallons each and a third digester of 750,000 gallons. The plant is a rather typical activated sludge facility which serves a population of approximately 100,000, two major grain processing factories and an assortment of industrial and food processing plants.

The upset essentially halted anaerobic digestion. The large digester was tested as a holding tank while one of the smaller units was slowly being revived. The second small digester was in the worst shape by March and was chosen to receive treatment in accordance with the present invention. Background data was collected over a one week period, and a composition comprising 75% tetra sodium pyrophosphate and 25% $Na_2CO_3$ was added on day 8. An initial dose brought the compound up to 0.03% wt/vol. in the digester. Smaller doses were given every 1-4 days, in order to maintain this 0.03% concentration over a 30 day period.

The results indicated a dramatically hastened recovery. The digester not receiving the composition of the invention had been well on the road to recovery using the conventional strategies of low loading rate, high retention time, and much patience, at the time of composition introduction to the test digester. The treatment of the present invention quickly brought the test digester, originally in much worse condition, onstream, and the typical digester performance parameters came to parallel those of the advance unit.

As previously stated, the compound addition was initiated on day 8. Volatile acids decreased from the 6,500–6,600 mg/l range to approximately 2,800 mg/l by the end of the study. This level of acid is still considered quite high, and is due at least in part to the high loading rate imposed on the digester. The pH rose dramatically from about 5.4 to about a consistent 6.8–7.2. Finally, acidity decreased dramatically from 1900 to an average 400–500 mg/l or $CaCO_3$.

The loading rate was increased throughout the study as reflected by a considerable decrease in retention time. Initially the "weekly average" retention time was 16.4 days. This level was decreased to 10.3 by day 15, and further decreased to 6.2 days during the final week of compound addition. Even though the retention time was greatly decreased over the 30 day test period, the percent total solids in the digester actually declined, indicating healthy biodegradation. Gas production should have been dramatically increased. Unfortunately, gas production rates were not monitored.

Percent methane in the gas increased from the mid 40's to the mid 50's during the 30 day test period. A higher methane content and a much lower volatile acid level would be expected had the retention time been fixed at a nominal 15–18 days.

Although the other 373,000 gallon digester cannot be compared as a strict, parallel control, its recovery was achieved over a much longer time period and under much less severe handling conditions. The composition of the present invention clearly is capable of significantly hastening the recovery process and improving digester stability. These results are in agreement with those found in prior Examples.

From the data provided above, it is clear that the present invention has distinct beneficial effects on the treatment of septic tank-type waste. A probable mechanism of action includes raising the pH in the sour environment to a level where bacterial activity can again proceed effectively with biodegredation. In utilizing the present invention, the neutralization of the pH can be controlled without raising the pH so high that the micro-organisms are further inhibited. Moreover, since the present invention supplies nutrients, it acts as an energy enhancer to the metabolic activity of the bacteria within the anaerobic system. It is also believed that another beneficial affect of the present invention may have on the biodegredation of sewage waste is the ability of the pyrophosphate of the present invention to act as a chelator in the delivery of essential trace metals for microbial uptake within the system.

While the present invention has been described particularly with respect to anaerobic waste digestion systems, and in particular septic tank systems, it is to be envisioned that the present invention is not to be limited thereto but may be applicable to any type of anaerobic digestion system, whether it deals with waste treatment or not, and whether the system is healthy or sick. Obviously, the present invention is most efficient when the anaerobic digestion system has become sour, the present invention rejuvenating the system to a healthy status. This rejuvenation capability is the result of a number of interrelated synergistic mechanisms occurring between the various components of the product mixture of the present invention. The end result is that by addition of the product mixture of the present invention to an anaerobic environment, the anaerobic bacteria present within the digestion system are again allowed to function normally at a healthy metabolic activity and growth rate. Thus, if the time for complete digestion using an anaerobic digestion system could be reduced to half of that presently required due to increased bacteriological activity and growth, the present invention would, in effect, double the anaerobic digester facilities in this country. Since such facilities are extremely expensive, considerable amounts of energy could be saved. It is envisioned that a wide variety of different types of anaerobic digestion systems can be treated utilizing the present invention.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

What is claimed is:

1. A product for stimulating and enhancing bacterial action in an anaerobic digestion environment comprising an inhibitory ion regulating component having an ionic substance antagonistic toward cations which inhibit bacterial metabolic activity, and an inorganic pyrophosphate-containing compound which synergistically acts with said ion regulating component to increase the metalobic activity of anaerobic bacteria in said environment.

2. The product as described in claim 1, wherein said inorganic pyrophosphate-containing compound comprises any ionic form of pyrophosphate.

3. The product as described in claim 2, wherein said inorganic pyrophosphate-containing compound is selected from the group consisting of sodium pyrophosphate, potassium pyrophosphate, di-sodium di-potassium pyrophosphate, and mixtures thereof.

4. The product as described in claim 3, wherein said inhibitory ion regulating component comprises sodium ions, said inhibitory cations being selected from the group consisting of calcium, potassium, magnesium, and mixtures thereof.

5. The product as described in claim 4, wherein said sodium ions are introduced into said product in the form of sodium carbonates.

6. The product as described in claim 1, wherein said product comprises from 5 to about 50 weight percent of said inhibitory ion regulating component.

7. The product as described in claim 1, wherein said product comprises from 95 to 50 weight percent of said inorganic pyrophosphate-containing compound.

8. The product as described in claim 1, wherein said anaerobic digestion environment comprises a septic tank system.

9. The product as described in claim 1, wherein said anaerobic digestion environment comprises an anaerobic digester.

10. The product as described in claim 1, wherein said anaerobic digestion environment comprises a fermentation system designed to produce food products.

11. A product for rejuvenating a sour sewage treatment system comprising a mixture of an inhibitory ion regulating component having an ionic substance antagonistic toward cations which inhibit bacterial metabolic activity, and an inorganic pyrophosphate.

12. A product as described in claim 11, wherein said inorganic pyrophosphate comprises any form of ionic pyrophosphate.

13. The product as described in claim 11, wherein said inorganic pyrophosphate is selected from the group consisting of sodium pyrophosphate, potassium pyrophosphate, di-sodium di-potassium pyrphophate, and mixtures thereof.

14. The product as described in claim 11, wherein said sewage treatment system includes a waste holding tank.

15. The product as described in claim 14, wherein said holding tank comprises a septic tank.

16. The product as described in claim 14, wherein said holding tank comprises an anaerobic digester.

17. The product as described in claim 14, wherein said product is present in an effective amount in said tank for increasing the pH of the contents thereof while simultaneously enhancing bacterial metabolic action therein.

18. The product as described in claim 11, wherein said product increases the growth of bacteria present in said system while simultaneously stimulating the metabolism of said bacteria.

* * * * *